(12) United States Patent
Watanabe et al.

(10) Patent No.: US 12,709,335 B2
(45) Date of Patent: Aug. 18, 2026

(54) STRUCTURAL MEMBER AND METHOD OF MANUFACTURING STRUCTURAL MEMBER

(71) Applicant: HONDA MOTOR CO., LTD., Tokyo (JP)

(72) Inventors: Hiroyuki Watanabe, Saitama (JP); Kimitoshi Fujishita, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 300 days.

(21) Appl. No.: 18/429,494

(22) Filed: Feb. 1, 2024

(65) Prior Publication Data

US 2024/0262430 A1 Aug. 8, 2024

(30) Foreign Application Priority Data

Feb. 3, 2023 (JP) ................................ 2023-015221

(51) Int. Cl.
*B62D 25/20* (2006.01)
*B33Y 80/00* (2015.01)
*B62D 25/04* (2006.01)

(52) U.S. Cl.
CPC .......... *B62D 25/2036* (2013.01); *B33Y 80/00* (2014.12); *B62D 25/04* (2013.01)

(58) Field of Classification Search
CPC ...... B62D 21/15; B62D 25/025; B62D 25/04; B62D 25/2036; B33Y 80/00
USPC .................... 296/30, 187.12, 193.06, 203.01
See application file for complete search history.

(56) References Cited

U.S. PATENT DOCUMENTS

| | | | | |
|---|---|---|---|---|
| 9,834,325 | B2 * | 12/2017 | Ramaska | B64G 1/22 |
| 12,006,874 | B2 * | 6/2024 | Hodgson | B33Y 80/00 |
| 12,077,215 | B2 * | 9/2024 | Godthi | B62D 25/04 |
| 2015/0360733 | A1 * | 12/2015 | Nagwanshi | B62D 29/004 180/311 |
| 2016/0263822 | A1 | 9/2016 | Boyd, IV | |
| 2017/0217088 | A1 | 8/2017 | Boyd, IV et al. | |
| 2019/0118682 | A1 * | 4/2019 | Faruque | B60N 2/75 |
| 2019/0217527 | A1 | 7/2019 | Boyd, IV | |
| 2020/0079429 | A1 | 3/2020 | Asai et al. | |
| 2021/0001549 | A1 | 1/2021 | Boyd, IV et al. | |
| 2022/0048109 | A1 * | 2/2022 | Kellett | B22F 10/00 |

FOREIGN PATENT DOCUMENTS

| | | |
|---|---|---|
| JP | 2019-513600 A | 5/2019 |
| JP | 2020-040444 A | 3/2020 |

* cited by examiner

*Primary Examiner* — Jason S Daniels
(74) *Attorney, Agent, or Firm* — Paratus Law Group, PLLC

(57) ABSTRACT

A structural member includes: a wall including a first side wall and a second side wall; a space surrounded by the wall; and a plurality of ribs provided in the space and coupling the first side wall and the second side wall, wherein the plurality of ribs include: a plurality of columnar first ribs which couple the first side wall and the second side wall, a plurality of columnar second ribs which couple the first side wall and the second side wall, a plurality of columnar third ribs which couple the first side wall and the second side wall, and a plurality of columnar fourth ribs which couple the first side wall and the second side wall, and a plurality of coupling portions each coupling the first rib, the second rib, the third rib, and the fourth rib are formed.

5 Claims, 5 Drawing Sheets

X1
X2
Z1
Z2
10
20
22X
(22)
21X
(21)
22a
22Y
(22)
60
43
41
50
42
21Y
(21)
44
30
40
23Y
(23)
60
V1
23a
31
D1
L1

STRUCTURAL MEMBER AND METHOD OF MANUFACTURING STRUCTURAL MEMBER

CROSS-REFERENCE TO RELATED APPLICATIONS

This application is based on and claims priority under 35 USC 119 from Japanese Patent Application No. 2023-015221 filed on Feb. 3, 2023, the entire content of which is incorporated herein by reference.

TECHNICAL FIELD

The present invention relates to a structural member and a method of manufacturing the structural member. The present invention relates particularly to a structural member, which includes a wall including side walls facing each other, such as a U-shaped frame member, a hollow pillar, and a joint, and a space surrounded by the wall, and a method of manufacturing the structural member.

BACKGROUND ART

In recent years, active efforts have been made to provide access to a sustainable transportation system in consideration of vulnerable people such as the elderly, the disabled person, and children among traffic participants.

In order to implement the above, focus has been placed on research and development on further improving safety and convenience of traffic by development related to improvement in rigidity of structural members.

As a method of improving the rigidity of the structural member, there are a method of increasing a wall thickness of the structural member, a method of making the structural member solid, and the like. For example, JP2020-040444A discloses a cross member having a U-shaped cross section and manufactured by integrally welding a plurality of panel members having different plate thickness dimensions.

However, this method increases a weight of the structural member. In addition, in a case where the structural member is joined to another member by welding, increasing the wall thickness of the structural member causes deterioration in the quality of welding at a welding portion.

Accordingly, in recent years, development of an additive manufacturing method capable of forming a complicated shape has progressed, and therefore, it has been studied to form reinforcing ribs having a complicated shape on a structural member using the additive manufacturing method. For example, JP2019-513600A discloses a three-dimensional structure having an underfill structure formed using the additive manufacturing method.

SUMMARY OF INVENTION

However, in order to increase the strength and rigidity of the structural member and to allow a load input from the outside to be received in a dispersed manner by the entire structural member, there is room for consideration regarding what shape the underfill structure is preferable to take.

The present invention provides a structural member and a method of manufacturing the structural member, in which the strength and rigidity can be increased and a load input from the outside can be received in a dispersed manner by the entire structural member.

By extension, the present invention contributes to development of a sustainable transportation system.

According to the present invention, the strength and rigidity of the structural member can be increased, and the load input from the outside can be received in a dispersed manner by the entire structural member.

DESCRIPTION OF EMBODIMENTS

Figure 1:
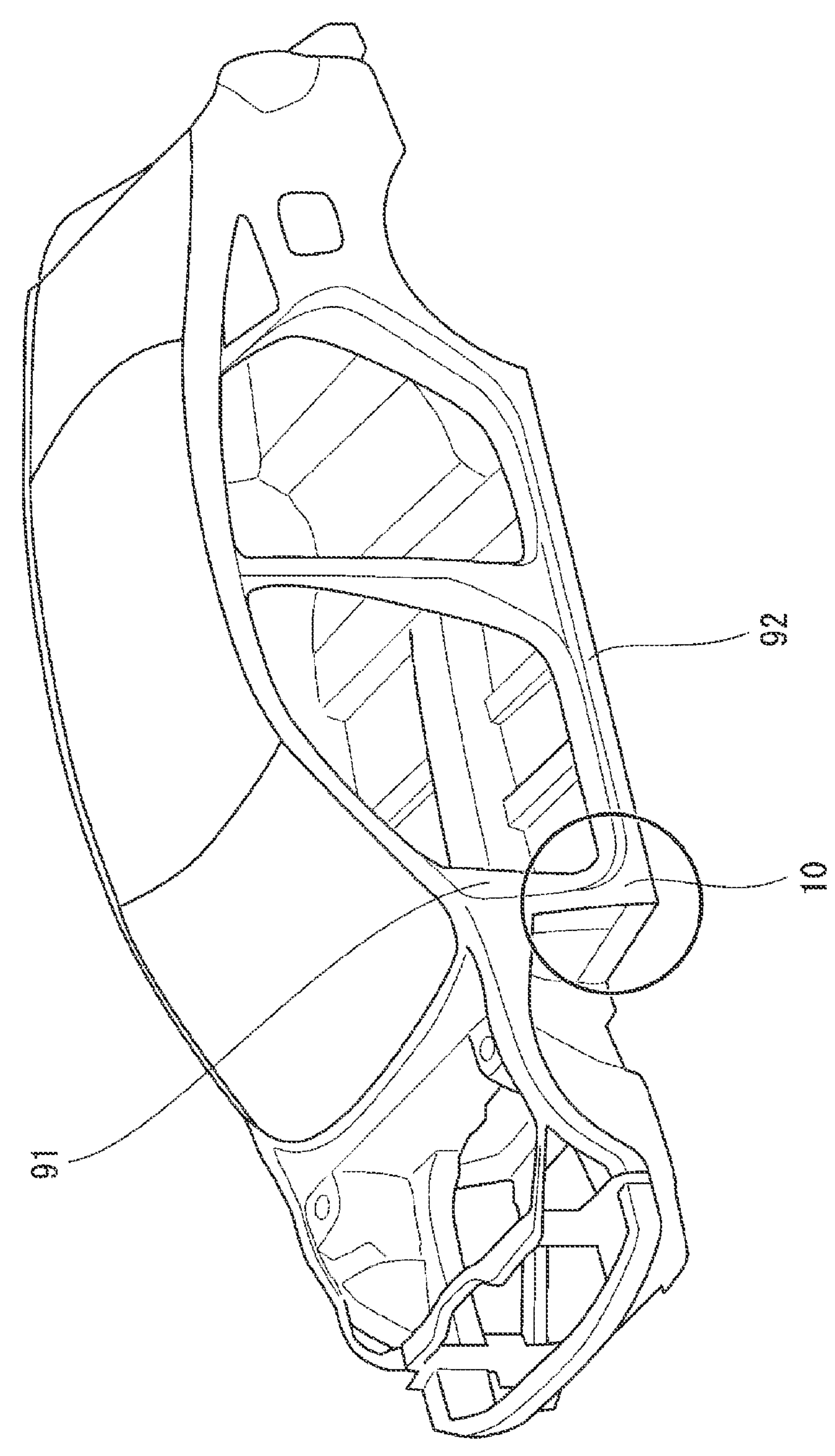
FIG. 1 is a perspective view of a vehicle to which a joint member according to an embodiment of the present invention is attached.

Hereinafter, a joint member as an embodiment of a structural member of the present invention will be described with reference to the accompanying drawings. Note that the drawings are viewed in directions of reference numerals.

As shown in FIG. 1, a joint member 10 of the present embodiment is a joint member that couples a pillar member 91 extending in an upper-lower direction of a vehicle and a side frame 92 extending in a front-rear direction along an outer-side end of a vehicle bottom portion in a vehicle width direction.

Figure 2:
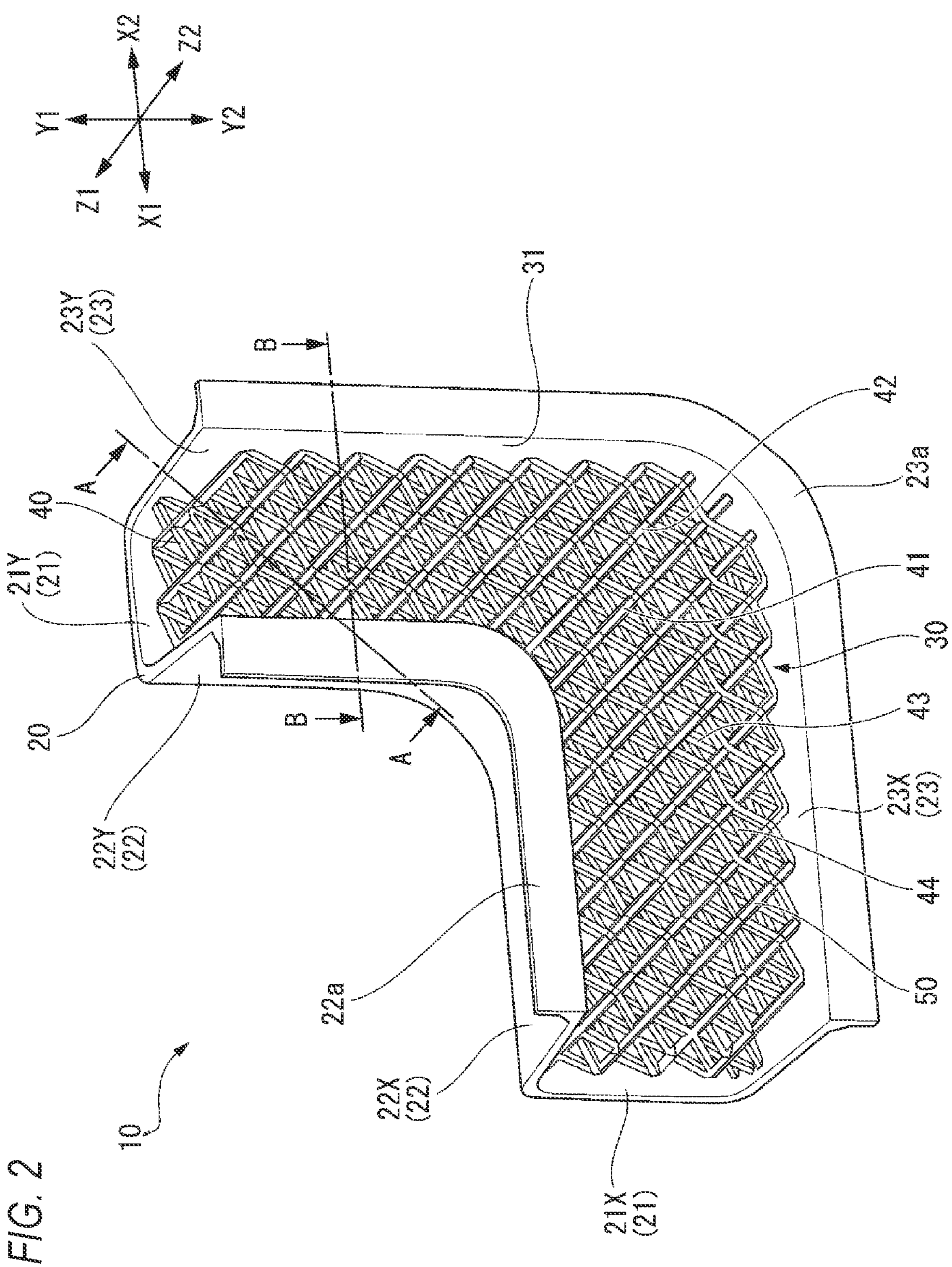
FIG. 2 is a perspective view of the joint member according to the embodiment of the present invention.
Figure 3:
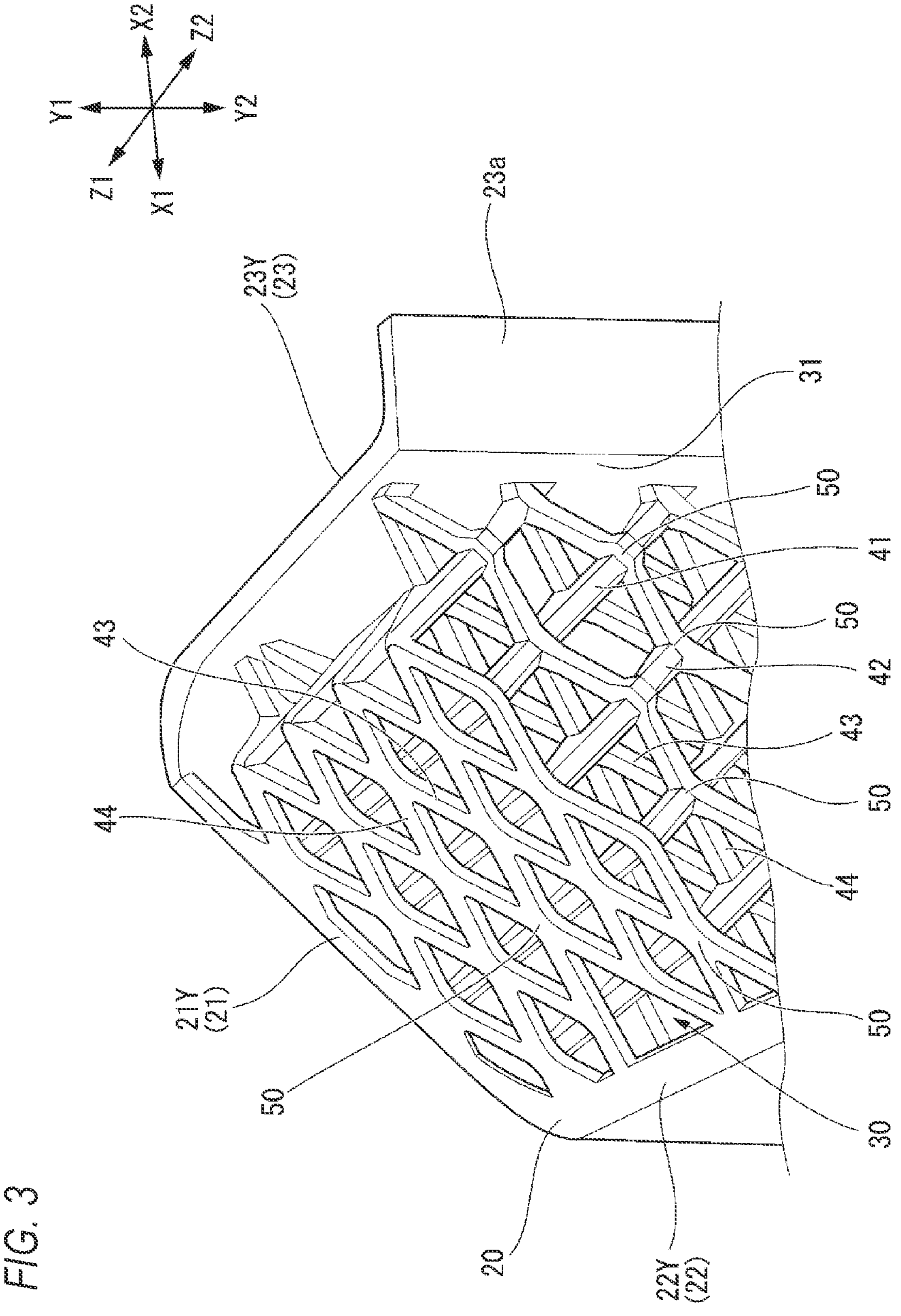
FIG. 3 is a cross-sectional perspective view taken along a line A-A of FIG. 2.
Figure 4:
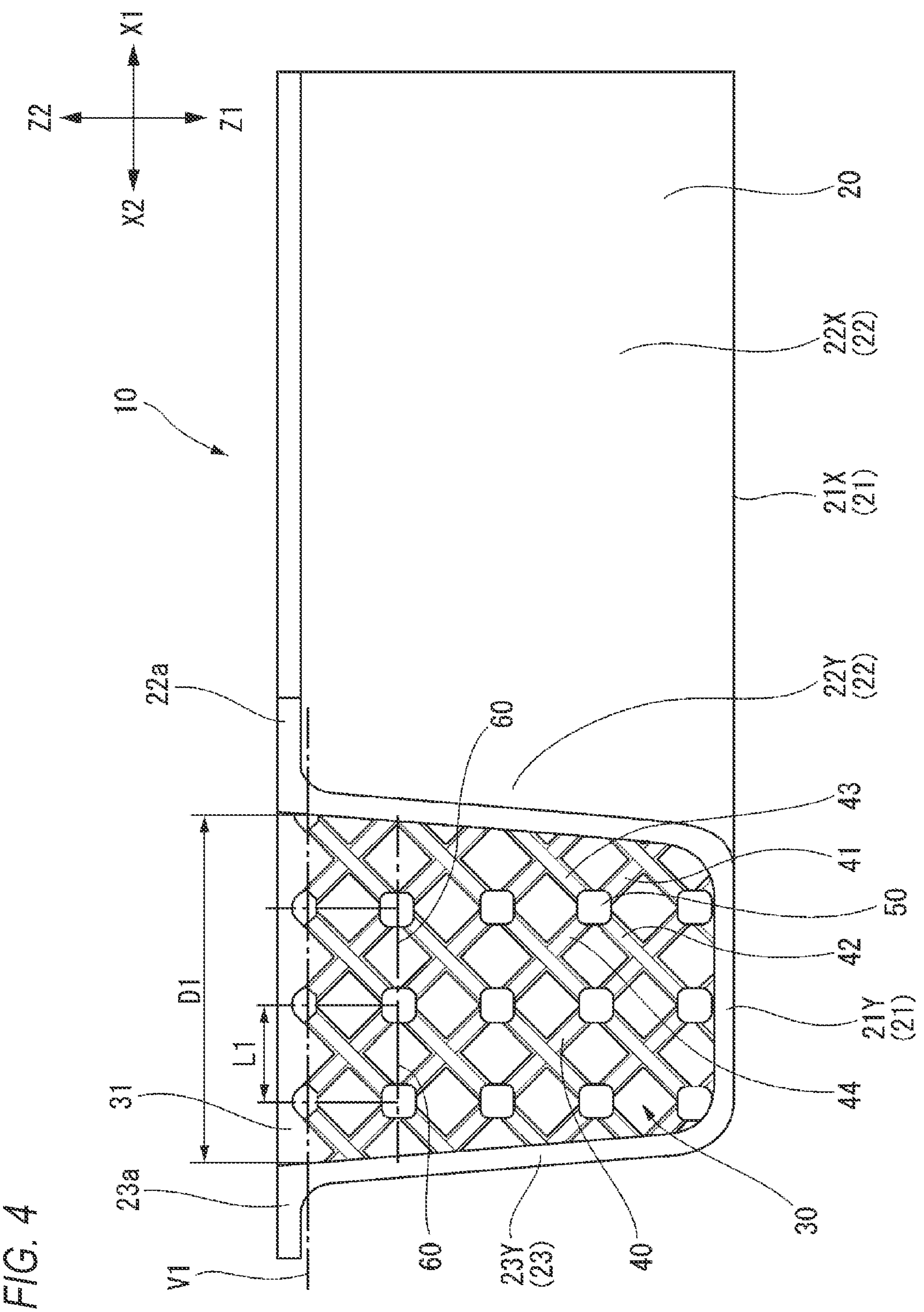
FIG. 4 is a cross-sectional view taken along a line B-B of FIG. 2.

As shown in FIGS. 2 to 4, the joint member 10 includes a wall 20, a space 30 surrounded by the wall 20, and a plurality of columnar ribs 40 provided in the space 30.

The wall 20 includes a bottom wall 21, and a first side wall 22 and a second side wall 23 which extend from both ends of the bottom wall 21 and face each other.

In the present specification and the like, in order to simplify and clarify the description, a direction perpendicular to the bottom wall 21 is defined as a Z direction. In the Z direction, a side on which the bottom wall 21 is formed in the joint member 10 is defined as a Z1 side, and a side in an extending direction of the first side wall 22 and the second side wall 23 extending from the bottom wall 21 is defined as a Z2 side. Two directions perpendicular to each other when viewed from the Z direction are defined as an X direction and a Y direction, respectively. Further, one side in the X direction is defined as an X1 side, the other side in the X direction is defined as an X2 side, one side in the Y direction is defined as a Y1 side, and the other side in the Y direction is defined as a Y2 side.

In the present embodiment, the joint member 10 has a substantially L shape when viewed from the Z direction.

The bottom wall 21 extends in a substantially L shape when viewed from the Z direction. The bottom wall 21 includes an X-direction extending portion 21X extending in the X direction and a Y-direction extending portion 21Y bent from an X2-side end of the X-direction extending portion 21X and extending in the Y direction toward the Y1 direction.

The first side wall 22 includes an X-direction extending portion 22X extending in the X direction and a Y-direction extending portion 22Y bent from an X2-side end of the X-direction extending portion 22X and extending in the Y direction toward the Y1 direction when viewed from the Z direction. A flange portion 22*a* extending in a flange shape is provided at a Z2-side end of the first side wall 22.

The second side wall 23 includes an X-direction extending portion 23X which extends in the X direction and faces the X-direction extending portion 22X of the first side wall 22 on the Y2 side in the Y direction, and a Y-direction extending portion 23Y which is bent from an X2-side end of the X-direction extending portion 23X, extends in the Y direction toward the Y1 direction, and faces the Y-direction extending portion 22Y of the first side wall 22 on the X2 side in the X direction, when viewed from the Z direction. A flange portion 23*a* extending in a flange shape is provided at a Z2-side end of the second side wall 23.

Accordingly, the bottom wall 21 extends in a facing direction facing the first side wall 22 and the second side wall 23, that is, in the X direction and the Y direction, and couples a Z1-side end of the first side wall 22 and a Z1-side end of the second side wall 23 in the Z direction.

The space 30 is surrounded by the bottom wall 21, the first side wall 22, and the second side wall 23.

An opening 31 is formed between the Z2-side end of the first side wall 22 and the Z2-side end of the second side wall 23 in the Z direction.

The plurality of ribs 40 include a plurality of columnar first ribs 41 each of which extends linearly in a first direction and which couple the first side wall 22 and the second side wall 23, a plurality of columnar second ribs 42 each of which extends linearly in a second direction and which couple the first side wall 22 and the second side wall 23, a plurality of columnar third ribs 43 each of which extends linearly in a third direction and which couple the first side wall 22 and the second side wall 23, and a plurality of columnar fourth ribs 44 each of which extends linearly in a fourth direction and which couple the first side wall 22 and the second side wall 23. A part of the first ribs 41, the second ribs 42, the third ribs 43, and the fourth ribs 44 couples the first side wall 22 and the bottom wall 21, and the other part of the first ribs 41, the second ribs 42, the third ribs 43, and the fourth ribs 44 couples the second side wall 23 and the bottom wall 21. The first direction, the second direction, the third direction, and the fourth direction are directions different from one another. In the present embodiment, the first direction is a direction from an (X1, Y1, Z1) side toward an (X2, Y2, Z2) side, the second direction is a direction from an (X1, Y1, Z2) side toward an (X2, Y2, Z1) side, the third direction is a direction from an (X1, Y2, Z2) side toward an (X2, Y1, Z1) side, and the fourth direction is a direction from an (X1, Y2, Z1) side toward an (X2, Y1, Z2) side.

In the present embodiment, a cross-sectional shape of each of the first rib 41, the second rib 42, the third rib 43, and the fourth rib 44 is a substantially hexagonal shape. The cross-sectional shape of each of the first rib 41, the second rib 42, the third rib 43, and the fourth rib 44 may be any shape, and may be a substantially square shape, a substantially circular shape, or a substantially elliptical shape.

Further, in the space 30, a plurality of coupling portions 50 that couple the first ribs 41, the second ribs 42, the third ribs 43, and the fourth ribs 44 are formed.

Accordingly, for example, when a load such as an impact is input to the second side wall 23 from the outside, the load input from the second side wall 23 is transmitted to the coupling portions 50 via the first ribs 41, the second ribs 42, the third ribs 43, and the fourth ribs 44, is dispersed from the coupling portions 50 to the first ribs 41, the second ribs 42, the third ribs 43, and the fourth ribs 44, and is transmitted to the facing first side wall 22 or the bottom wall 21 via the first ribs 41, the second ribs 42, the third ribs 43, and the fourth ribs 44.

Accordingly, when a load such as an impact is input from the outside, the joint member 10 can receive the load in a dispersed manner by the entire joint member 10 including the first ribs 41, the second ribs 42, the third ribs 43, the fourth ribs 44, the first side wall 22, the second side wall 23, and the bottom wall 21. Further, since the first ribs 41, the second ribs 42, the third ribs 43, and the fourth ribs 44 each have a columnar shape extending linearly, the strength and rigidity of the entire joint member 10 can be increased. Thus, the strength and rigidity of the joint member 10 can be increased, and a load input from the outside can be received in a dispersed manner by the entire joint member 10.

Further, each of the first rib 41, the second rib 42, the third rib 43, and the fourth rib 44 is coupled to others of the ribs 40 at the coupling portion 50. In other words, the first rib 41, the second rib 42, the third rib 43, and the fourth rib 44 are not coupled to other ribs 40 except at the coupling portion 50.

Accordingly, even when a load in any one of the first direction, the second direction, the third direction, and the fourth direction is large, the load is dispersed at the coupling portion 50 in each of the extending directions of the first ribs 41, the second ribs 42, the third ribs 43, and the fourth ribs 44, that is, four directions including the first direction, the second direction, the third direction, and the fourth direction, and thus the load can be received in a more uniformly dispersed manner by the entire joint member 10.

Thus, the first rib 41, the second rib 42, the third rib 43, and the fourth rib 44 have a three-dimensional structure.

Figure 5:
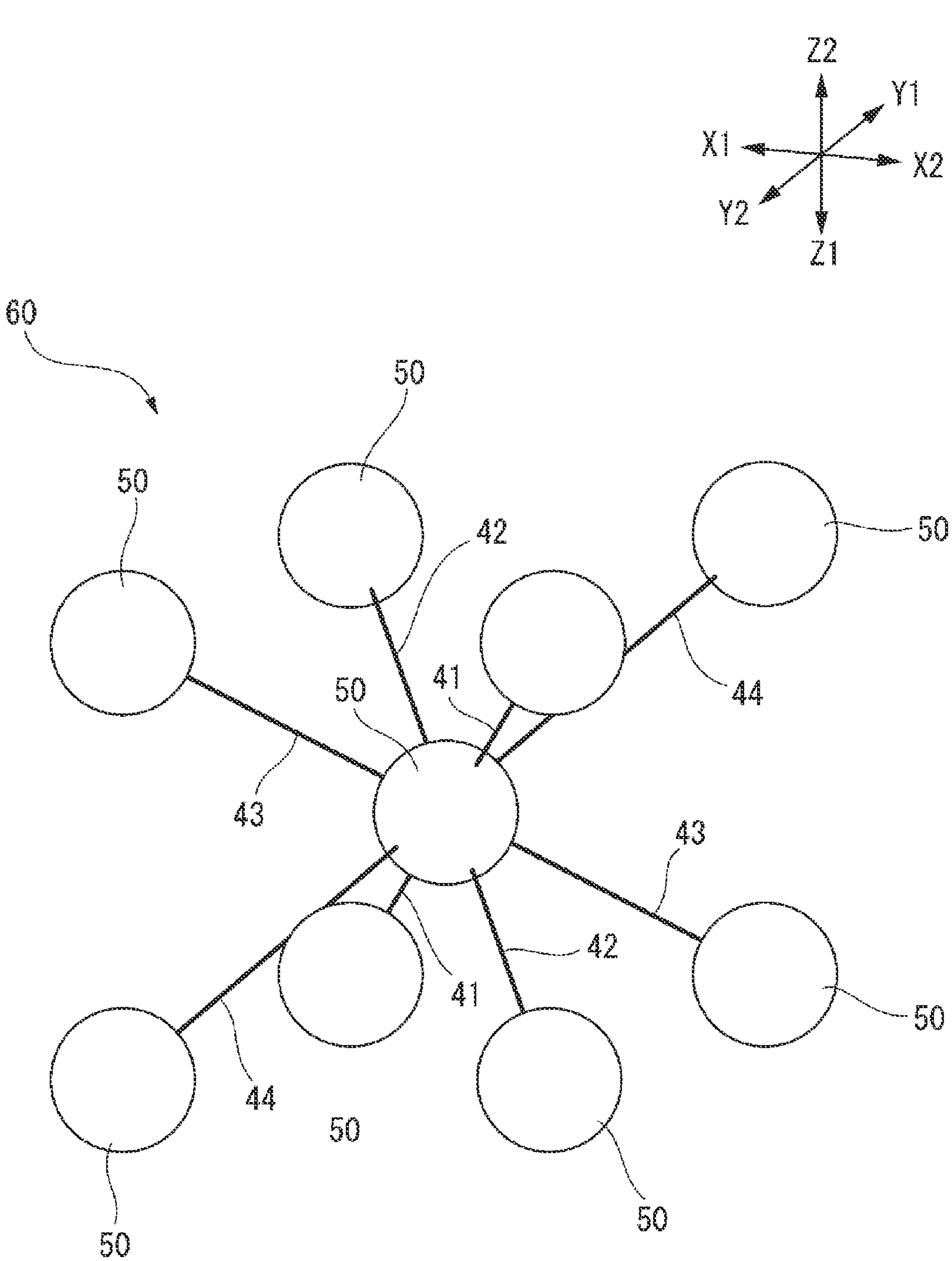
FIG. 5 is a schematic diagram of a unit lattice formed by first ribs, second ribs, third ribs, fourth ribs, and coupling portions in the joint member of FIG. 2.

As shown in FIG. 5, the plurality of coupling portions 50 are arranged such that each of the coupling portions 50 is positioned at a vertex or a center of a unit lattice 60 which is a predetermined cubic body. That is, the plurality of coupling portions 50 are arranged in a body-centered cubic lattice shape with a predetermined cubic body as the unit lattice 60. Further, the first rib 41, the second rib 42, the third rib 43, and the fourth rib 44 respectively extend linearly along four diagonal lines of the unit lattice 60.

Accordingly, when a load such as an impact is input to the joint member 10 from the outside, the load is more uniformly dispersed to the first ribs 41, the second ribs 42, the third ribs 43, and the fourth ribs 44 at the coupling portions 50, so that the load can be received in a more uniformly dispersed manner by the entire joint member 10.

Returning to FIG. 2 to FIG. 4, the plurality of coupling portions 50 are arranged such that the unit lattices 60 are formed side by side in the facing direction facing the first side wall 22 and the second side wall 23. Further, the plurality of coupling portions 50 are arranged such that a separation distance D1 in the facing direction between the first side wall 22 and the second side wall 23 at a Z-direction position (a virtual line V1 in FIG. 4) of a plurality of coupling portions 50, which are formed on a farthest side from the bottom wall 21 in the Z direction, is an integral multiple of half a length L1 of one side of the unit lattice 60. In the present embodiment, the separation distance D1 in the facing direction between the first side wall 22 and the second side wall 23 at the Z-direction position of the virtual line V1 in FIG. 4 is 7/2 times (3.5 times) the length L1 of one side of the unit lattice 60.

In this case, at the Z-direction position (the virtual line V1 in FIG. 4) of the plurality of coupling portions 50 which are formed on the farthest side from the bottom wall 21 in the Z direction, the coupling portions 50 are formed on one of the first side wall 22 and the second side wall 23. Further, at this time, the coupling portions 50 formed on a bottom-wall side one row below the coupling portions 50 which are formed on the farthest side from the bottom wall 21 in the Z direction or below the farthest side from the bottom wall 21 in the Z direction are formed on the other of the first side wall 22 and the second side wall 23.

Accordingly, in the vicinity of the opening 31 at which the strength and rigidity are likely to be reduced in the joint member 10, the coupling portions 50 are formed on one of the first side wall 22 and the second side wall 23, and the coupling portions 50 formed on a bottom wall 21 side one row below the coupling portions 50 which are formed on the farthest side from the bottom wall 21 in the Z direction or below the farthest side from the bottom wall 21 in the Z direction are formed on the other of the first side wall 22 and the second side wall 23.

Accordingly, even when a load is input to the joint member 10 in the vicinity of the opening 31, the load can be received by the first side wall 22 or the second side wall 23, and the coupling portions 50 which are formed on the first side wall 22 or the second side wall 23 on the farthest side from the bottom wall 21 in the Z direction or the coupling portions 50 which are formed on the first side wall 22 or the second side wall 23 on the bottom wall 21 side one row below the farthest side from the bottom wall 21 in the Z direction. Accordingly, the strength and rigidity of the joint member 10 in the vicinity of the opening 31 are increased, and thus the strength and rigidity of the entire joint member 10 are further increased.

When manufacturing the joint member 10, the first ribs 41, the second ribs 42, the third ribs 43, and the fourth ribs 44 are integrally formed by additive manufacturing a material. An additive manufacturing method of forming a shape by additive manufacturing a material is one of methods of manufacturing a three-dimensional shape. The additive manufacturing method is a manufacturing method of forming a member having a three-dimensional shape by laminating, based on a three-dimensional model, layers of a material corresponding to continuous cross sections of the three-dimensional model one by one. The additive manufacturing method is also known as a 3D printing technique. Unlike a related-art cutting process of forming a final product by performing cutting on a material block, the final product is formed by laminating layers of a material in the additive manufacturing method, making it possible to shape a complicated three-dimensional shape. The additive manufacturing method is also called an additive manufacturing method, additive manufacturing, or an additive manufacturing (AM) technique.

In the additive manufacturing method, metal, ceramic, resin, or the like can be used as a material to be laminated. In the present embodiment, the joint member 10 is formed of metal. The joint member 10 may be formed of ceramic, resin, or the like.

Accordingly, when manufacturing the joint member 10, the first ribs 41, the second ribs 42, the third ribs 43, and the fourth ribs 44, which have a complicated three-dimensional shape that is difficult to form by cutting, forging, punching, or the like in the related art, can be integrally formed by additive manufacturing a material.

In the present embodiment, when manufacturing the joint member 10, the first ribs 41, the second ribs 42, the third ribs 43, the fourth ribs 44, and the wall 20 (the bottom wall 21, the first side wall 22, the second side wall 23, and the flange portions 22*a*, 23*a*) are integrally formed by additive manufacturing a material.

Accordingly, the first ribs 41, the second ribs 42, the third ribs 43, and the fourth ribs 44, which have a complicated three-dimensional shape that is difficult to form by machining, forging, punching, or the like in the related art, can be integrally formed, and the first ribs 41, the second ribs 42, the third ribs 43, and the fourth ribs 44 can be formed integrally with the wall 20, so that the number of man-hours required for manufacturing the joint member 10 can be reduced.

Although an embodiment of the present invention has been described above with reference to the accompanying drawings, it is needless to say that the present invention is not limited to the embodiment. It is apparent that those skilled in the art can conceive of various modifications and changes within the scope described in the claims, and it is understood that such modifications and changes naturally fall within the technical scope of the present invention. In addition, respective constituent elements in the above embodiments may be freely combined without departing from the gist of the invention.

For example, in the present embodiment, the plurality of coupling portions 50 are arranged in a body-centered cubic lattice shape with a predetermined cubic body as the unit lattice 60, but the plurality of coupling portions 50 may be arranged in an face-centered cubic lattice shape, or may be arranged in another lattice shape.

For example, in the present embodiment, the joint member 10 extends in a substantially L shape when viewed from the Z direction, but as long as the joint member 10 includes the wall 20 including the first side wall 22 and the second side wall 23 facing each other, and the first side wall 22 and the second side wall 23 may extend substantially linearly or may extend in a curved shape when viewed from the Z direction.

Further, for example, in the present embodiment, the structural member is the joint member 10, but may be any structural member.

In this specification, at least the following matters are described. In parentheses, the corresponding constituent elements and the like in the above embodiment are shown as an example, but the present invention is not limited thereto.

(1) A structural member (joint member 10) including:

a wall (wall 20) including a first side wall (first side wall 22) and a second side wall (second side wall 23) facing each other;

a space (space 30) surrounded by the wall; and a plurality of ribs (ribs 40) provided in the space and coupling the first side wall and the second side wall, in which the plurality of ribs include:

- a plurality of columnar first ribs (first ribs 41) each of which extends linearly in a first direction and which couple the first side wall and the second side wall,
- a plurality of columnar second ribs (second ribs 42) each of which extends linearly in a second direction and which couple the first side wall and the second side wall,
- a plurality of columnar third ribs (third ribs 43) each of which extends linearly in a third direction and which couple the first side wall and the second side wall, and
- a plurality of columnar fourth ribs (fourth ribs 44) each of which extends linearly in a fourth direction and which couple the first side wall and the second side wall, the first direction, the second direction, the third direction, and the fourth direction are directions different from one another, and a plurality of coupling portions (coupling portions 50) each coupling the first rib, the second rib, the third rib, and the fourth rib are formed.

According to the above (1), when a load such as an impact is input from the outside to the joint member, the load can be received in a dispersed manner by the entire joint member including the first ribs, the second ribs, the third ribs, the fourth ribs, the first side wall, and the second side wall. Further, since the first ribs, the second ribs, the third ribs, and the fourth ribs each have a columnar shape extending linearly, the strength and rigidity of the entire joint member can be increased. Thus, the strength and rigidity of the joint member can be increased, and the load input from the outside can be received in a dispersed manner by the entire joint member.

(2) The structural member according to the above (1), in which each of the first rib, the second rib, the third rib, and the fourth rib is coupled to others of the ribs at the coupling portion.

According to the above (2), even when a load in any one of the first direction, the second direction, the third direction, and the fourth direction is large, the load is dispersed at the coupling portions in each of the extending directions of the first ribs, the second ribs, the third ribs, and the fourth ribs, that is, four directions including the first direction, the second direction, the third direction, and the fourth direction, and thus the load can be received in a more uniformly dispersed manner by the entire joint member.

(3) The structural member according to the above (2), in which the plurality of coupling portions are arranged in a body-centered cubic lattice shape in which each of the coupling portions is positioned at a vertex or a center of a unit lattice (unit lattice 60) which is a predetermined cubic body.

According to the above (3), when a load such as an impact is input to the joint member from the outside, the load is more uniformly dispersed to the first ribs, the second ribs, the third ribs, and the fourth ribs at the coupling portions, so that the plurality of coupling portions allow the load to be received in a more uniformly dispersed manner by the entire joint member.

(4) The structural member according to the above (3), in which the wall further includes a bottom wall (bottom wall 21) extending in a facing direction facing the first side wall and the second side wall and coupling one end of the first side wall and one end of the second side wall in a perpendicular direction perpendicular to the facing direction, an opening (opening 31) is formed between the other end of the first side wall and the other end of the second side wall in the perpendicular direction, and the plurality of coupling portions are arranged such that a plurality of the unit lattices are formed side by side in the facing direction, and are arranged such that a separation distance (separation distance D1) in the facing direction between the first side wall and the second side wall at a perpendicular-direction position of a plurality of the coupling portions which are formed on a farthest side from the bottom wall in the perpendicular direction is an integral multiple of half a length of one side (a length L1 of one side) of the unit lattice.

According to the above (4), even when a load is input to the joint member in the vicinity of the opening, the load can be received by the first side wall or the second side wall, and the coupling portions which are formed on the first side wall or the second side wall on the farthest side from the bottom wall in the perpendicular direction or the coupling portions which are formed on the first side wall or the second side wall on the bottom wall side one row below the farthest side from the bottom wall in the perpendicular direction. Accordingly, the strength and rigidity of the joint member in the vicinity of the opening are increased, and thus the strength and rigidity of the entire joint member are further increased.

(5) A method of manufacturing the structural member according to any one of the above (1) to (4), the method including:

forming the first ribs, the second ribs, the third ribs, and the fourth ribs integrally by additive manufacturing a material.

According to the above (5), the first ribs, the second ribs, the third ribs, and the fourth ribs, which have a complicated three-dimensional shape that is difficult to form by cutting, forging, punching, or the like in the related art, can be integrally formed.

(6) A method of manufacturing the structural member according to any one of the above (1) to (4), the method including:

forming the first ribs, the second ribs, the third ribs, the fourth ribs, and the wall integrally by additive manufacturing a material.

According to the above (6), the first ribs, the second ribs, the third ribs, and the fourth ribs, which have a complicated three-dimensional shape that is difficult to form by machining, forging, punching, or the like in the related art, can be integrally formed, and the first ribs, the second ribs, the third ribs, and the fourth ribs can be formed integrally with the wall, so that the number of man-hours required for manufacturing the joint member can be reduced.

What is claimed is:

1. A structural member comprising:

a wall including a first side wall and a second side wall facing each other;

a space surrounded by the wall; and a plurality of ribs provided in the space and coupling the first side wall and the second side wall, wherein the plurality of ribs include:

a plurality of columnar first ribs each of which extends linearly in a first direction and which couple the first side wall and the second side wall, a plurality of columnar second ribs each of which extends linearly in a second direction and which couple the first side wall and the second side wall, a plurality of columnar third ribs each of which extends linearly in a third direction and which couple the first side wall and the second side wall, and a plurality of columnar fourth ribs each of which extends linearly in a fourth direction and which couple the first side wall and the second side wall, the first direction, the second direction, the third direction, and the fourth direction are directions different from one another, a plurality of coupling portions each coupling the first rib, the second rib, the third rib, and the fourth rib are formed, each of the first rib, the second rib, the third rib, and the fourth rib is coupled to others of the ribs at the coupling portion, the plurality of coupling portions are arranged in a body-centered cubic lattice shape in which each of the coupling portions is positioned at a vertex or a center of a unit lattice which is a predetermined cubic body, the wall further includes a bottom wall extending in a facing direction in which the first side wall and the second side wall face each other and coupling one end of the first side wall and one end of the second side wall in a perpendicular direction perpendicular to the facing direction, an opening is formed between an other end of the first side wall and an other end of the second side wall in the perpendicular direction, and the plurality of coupling portions are arranged such that a plurality of the unit lattices are formed side by side in the facing direction, and are arranged such that a separation distance in the facing direction between the first side wall and the second side wall at a perpendicular-direction position of a plurality of the coupling portions which are formed on a farthest side from the bottom wall in the perpendicular direction is an integral multiple of half a length of one side of the unit lattice.

2. A method of manufacturing the structural member according to claim 1, the method comprising:

forming the first ribs, the second ribs, the third ribs, and the fourth ribs integrally by additive manufacturing a material.

3. A method of manufacturing the structural member according to claim 1, the method comprising:

forming the first ribs, the second ribs, the third ribs, the fourth ribs, and the wall integrally by additive manufacturing a material.

4. A structural member comprising:

a wall including a first side wall and a second side wall facing each other;

a space surrounded by the wall; and a plurality of ribs provided in the space and coupling the first side wall and the second side wall, wherein the plurality of ribs include:

a plurality of columnar first ribs each of which extends linearly in a first direction and which couple the first side wall and the second side wall, a plurality of columnar second ribs each of which extends linearly in a second direction and which couple the first side wall and the second side wall, a plurality of columnar third ribs each of which extends linearly in a third direction and which couple the first side wall and the second side wall, and a plurality of columnar fourth ribs each of which extends linearly in a fourth direction and which couple the first side wall and the second side wall, the first direction, the second direction, the third direction, and the fourth direction are directions different from one another, a plurality of coupling portions each coupling the first rib, the second rib, the third rib, and the fourth rib are formed, each of the first rib, the second rib, the third rib, and the fourth rib is joined between the first side wall and the second side wall without connecting through the coupling portions, the first ribs and the second ribs intersect within a plane A, the third ribs and the fourth ribs intersect within a plane B, the plane A and the plane B are parallel to each other, and the plane A and the plane B are coupled by the coupling portions, and the first ribs, the second ribs, the third ribs, and the fourth ribs are not coupled to other ribs except at the coupling portions.

5. A structural member comprising:

a first side wall and a second side wall facing each other;

a bottom wall coupling one end of the first side wall and one end of the second side wall;

an opening formed between an other end of the first side wall and an other end of the second side wall; and a plurality of ribs and coupling portions disposed between the first side wall and the second side wall, wherein a plurality of the coupling portions formed on a farthest side from the bottom wall are formed on one of the first side wall and the second side wall, a plurality of the coupling portions formed on a side of the bottom wall one row below the coupling portions formed on the farthest side from the bottom wall are formed on other of the first side wall and the second side wall, and the coupling portions are positioned at vertices or a center of a unit lattice.

* * * * *